United States Patent [19]

Copen

[11] Patent Number: 4,810,140

[45] Date of Patent: Mar. 7, 1989

[54] APPARATUS FOR MACHINING SLOTS IN APERTURES

[76] Inventor: Robert L. Copen, 3468 Greenwich Rd., Norton, Ohio 44203

[21] Appl. No.: 106,264

[22] Filed: Oct. 9, 1987

[51] Int. Cl.$^4$ .............................................. B23D 37/04
[52] U.S. Cl. .................................... 409/259; 409/279
[58] Field of Search ............... 409/243, 244, 259, 279, 409/296, 304, 307, 283; 407/13–19

[56] References Cited

U.S. PATENT DOCUMENTS

| 275,393 | 4/1883 | Knowles | 409/259 |
|---|---|---|---|
| 475,352 | 5/1892 | Smith | 407/15 |
| 685,772 | 11/1901 | Lapointe | 409/259 |
| 1,028,824 | 6/1912 | Lapointe | 409/279 |
| 1,339,656 | 5/1920 | Lapointe | 407/19 |
| 2,165,977 | 7/1939 | Maxwell | 409/276 |
| 2,814,238 | 11/1957 | Schupner | 409/283 |
| 4,284,377 | 8/1981 | Piper | 409/307 |

*Primary Examiner*—Neil Abrams
*Attorney, Agent, or Firm*—Renner, Kenner, Greive, Bobak, Taylor & Weber

[57] ABSTRACT

A portable device (10) for excising an axial slot (8) into the boundary surface (16) of an aperture (15). The device (10) includes a guide (11), a machining implement (12) and a power source (13). The guide (11) has proximal and distal ends (19 and 20) with an exterior configuration including at least a horn surface (26) and a transitional surface (30). A reaction flange (21) extends radially outwardly from the proximal end (19) of the guide (11). A slideway (35) extends longitudinally within the guide (11), and a tracking channel (36) extends radially outwardly from the slideway (35) to penetrate the guide (11) along the axial extent thereof. The machining implement (12) includes a drive shaft (40) that is axially translatable within the slideway (35) and a plurality of teeth (45) that are progressively stepped with the shortest tooth (45A) being located in proximity in the medial portion (46) of the shaft (40) and with the highest tooth (45N) being located in proximity to the distal end (48) of the shaft (40). The power source (13) is connected to, and selectively protracts and retracts, the shaft (40). When the machining implement (12) is protracted relative to the guide (11) the assembled combination can be operable received through an aperture (15) in a workpiece (14) to excise a slot (81) in the boundary surface (16) of the aperture (15) with access to only one side of the workpiece (14).

3 Claims, 3 Drawing Sheets

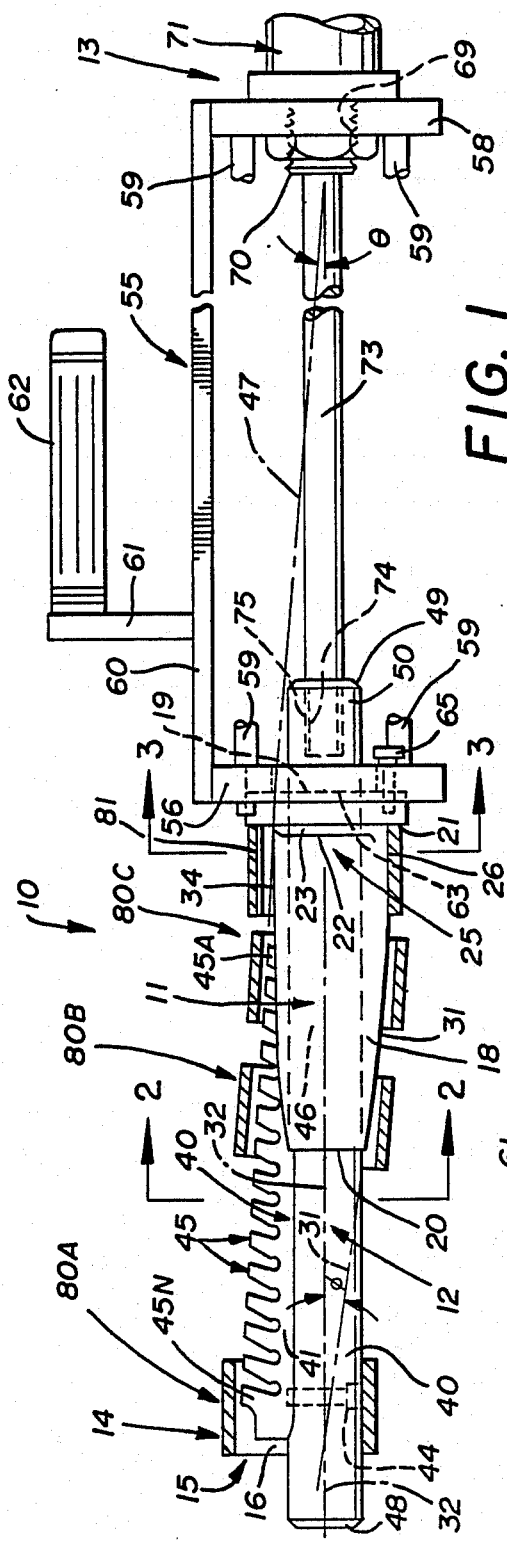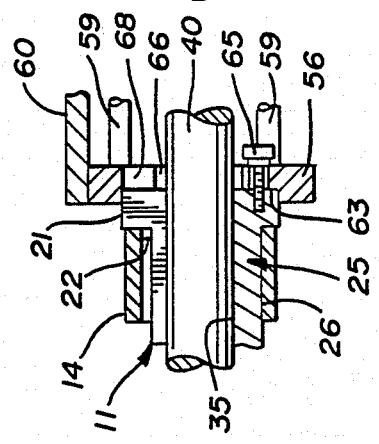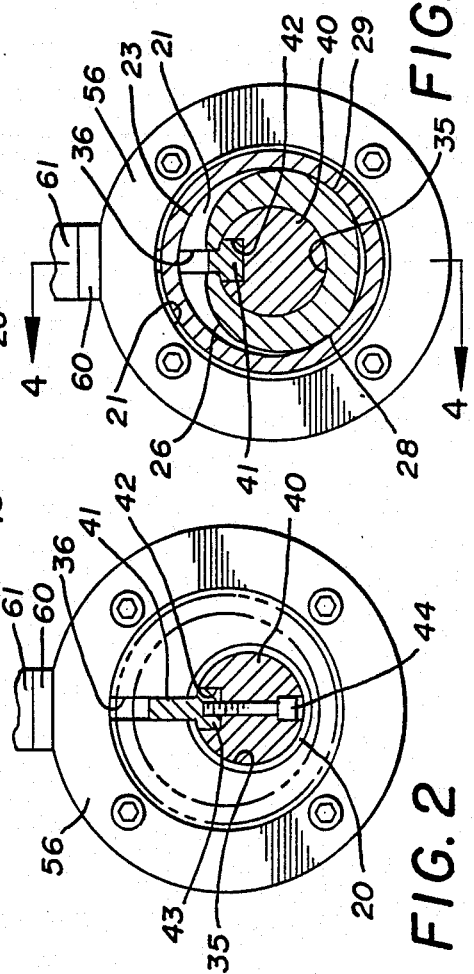

APPARATUS FOR MACHINING SLOTS IN APERTURES

TECHNICAL FIELD

The present invention relates to an apparatus and method for cutting axially oriented slots, such as keyways, into the boundary surface of an aperture. More particularly, the present invention relates to a portable apparatus and method capable of effecting a pull-type broaching operation. Specifically, the present invention relates to a portable apparatus and method that permits a machining implement to be operably inserted through an aperture in the workpiece to be machined from the same side thereof as the guide is inserted and from the same side as the power source employed to operate the machining implement is located, without the need for accessing the opposite side of the workpiece.

BACKGROUND OF THE INVENTION

Machinists recognize that "broaching" is a method of machining metallic workpieces whereby successive levels of metal are removed by a multi-toothed tool called a broach. The broach is either pushed or pulled across a surface of the workpiece in order to cut away the metal and impart the desired configuration to the surface upon which the machining operation is performed.

Broaching machines are, however, typically quite expensive, and substantial fixtures are required to secure the workpiece during the broaching operation. The fixture itself must not deflect, or move, under the cutting pressures, which are quite high, and the clamping means by which the workpiece is secured to the fixture must also ensure that the workpiece will not slip during the broaching operation, even if unusually heavy loads are encountered, such as would result from attempting to excise too substantial a layer of metal or from cutting through a hard spot. Any slippage of the workpiece during the broaching operation would not only jeopardize the workpiece but could also break one or more teeth on the broach or even break the broach itself.

Broaching fixtures are also employed to effect accurate positioning of the workpiece relative to the broaching machine, and, for some machining operations, to effect indexing of the workpiece and even to provide a means by which to move the workpiece into and out of cutting position and thereby assure a more convenient access for mounting and demounting of the workpiece relative to the fixture.

There are both push-type and pull-type broaching machines. With either variety access to both sides of the workpiece is mandatory, and particularly when machining the boundary surface of an aperture through the workpiece.

With the pull-type broaching machine the broach must be positioned on one side of the workpiece so that a front pilot on the broach can be inserted into the aperture of the workpiece that is to be machined, with the shank of the broach extending through the aperture for connection to the pull head of the broaching machine located on the opposite side of the workpiece. The broaching machine then pulls the broach through the aperture in the workpiece to effect the desired machining operation upon the boundary surface of the aperture.

Even on the push-type broaching machines access is required to both sides of the workpiece. With the push-type broaching machine the front pilot is on the opposite end of the broach, and both the broach and the front pilot are initially on the same side of the workpiece as the broaching machine itself. After the machining operation is completed, however, the broach must be disconnected from the broaching machine and removed from the opposite side of the workpiece, because the broach must never be moved through the workpiece back to the starting position.

In view of even the brief requirements discussed above it becomes apparent that heretofore known broaching machines, and the requisite fixtures, are not readily taken into the field for set up on the job site. Moreover, there is no known broaching apparatus that is capable of machining the boundary surface of an aperture in a workpiece without having full access to both sides of the workpiece.

SUMMARY OF THE INVENTION

It is, therefore, a primary object of the present invention to provide a cutting device which functions as an improved pull-type broaching machine but which can be transported by hand into the field for operation on site.

It is a another object of the present invention to provide a cutting device, as above, which does not require a fixture, as such, to support the workpiece.

It is a further object of the present invention to provide a cutting device, as above, which requires access to only one side of the workpiece.

It is yet another object of the present invention to provide a cutting device, as above, that is relatively inexpensive to manufacture and maintain.

It is an even further object of the present invention to provide a method for excising an axial slot in the boundary surface of an aperture through a workpiece with access to only one side of the workpiece.

These and other objects of the invention, as well as the advantages thereof over existing and prior art forms, which will be apparent in view of the following detailed specification, are accomplished by means hereinafter described and claimed.

In general, a cutting device embodying the concepts of the present invention employs a guide which presents a uniquely configured exterior surface between the proximal and distal ends thereof. A reaction flange projects radially outwardly from the proximal end of the guide, and an internal slideway extends longitudinally through the guide means. A tracking channel opens radially outwardly from the slideway to penetrate the guide means along the full axial extent thereof.

A machining implement comprises a drive shaft from which a plurality of cutting teeth are presented, and a power source is employed to effect protraction and retraction of the drive shaft relative to the guide. For the purpose of establishing a verbal frame of reference, the proximal and distal ends of the drive shaft are determined by their locational relationship to the power source. As such, the cutting teeth extend between the medial portion of the drive shaft and the distal end thereof, and the teeth are progressively stepped with the shortest tooth being located in proximity to the medial portion of the drive shaft, and with the highest tooth being located in proximity to the distal end of the drive shaft. The drive shaft is axially translatable within the slideway, and the cutting teeth are axially translatable along the tracking channel.

The greatest projected elevational dimension axially along the profile of the assembled guide and drive shaft, including the elevational projection of said cutting teeth when said drive shaft is protracted relative to said guide, is no greater than the corresponding dimension of the aperture within which the slot is to be excised. Such dimensioning permits facile insertion, and manipulation, of the assembled guide means and drive shaft through, and with respect to, the aperture when the drive shaft is protracted with respect to the guide means. Conversely, the greatest projected elevational dimension axially along the profile of the assembled guide means and drive shaft (also including the elevational projection of said cutting teeth) when said drive shaft is retracted relative to said guide means, is greater than the corresponding dimension of the aperture as a result of the radial projection of the cutting teeth by an amount equal to the radial dimension of the slot to be excised along the boundary surface of the aperture.

An exemplary cutting device embodying the concepts of the present invention is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 1 is a side elevational view of a cutting device embodying the concepts of the present invention;

FIG. 2 is an enlarged cross section taken substantially along line 2—2 of FIG. 1;

FIG. 3 is an enlarged cross section taken substantially along line 3—3 of FIG. 1;

FIG. 4 is a vertical cross section taken substantially along line 4—4 of FIG. 3, but in the same scale as FIG. 1;

DESCRIPTION OF AN EXEMPLARY EMBODIMENT

Figure 5:
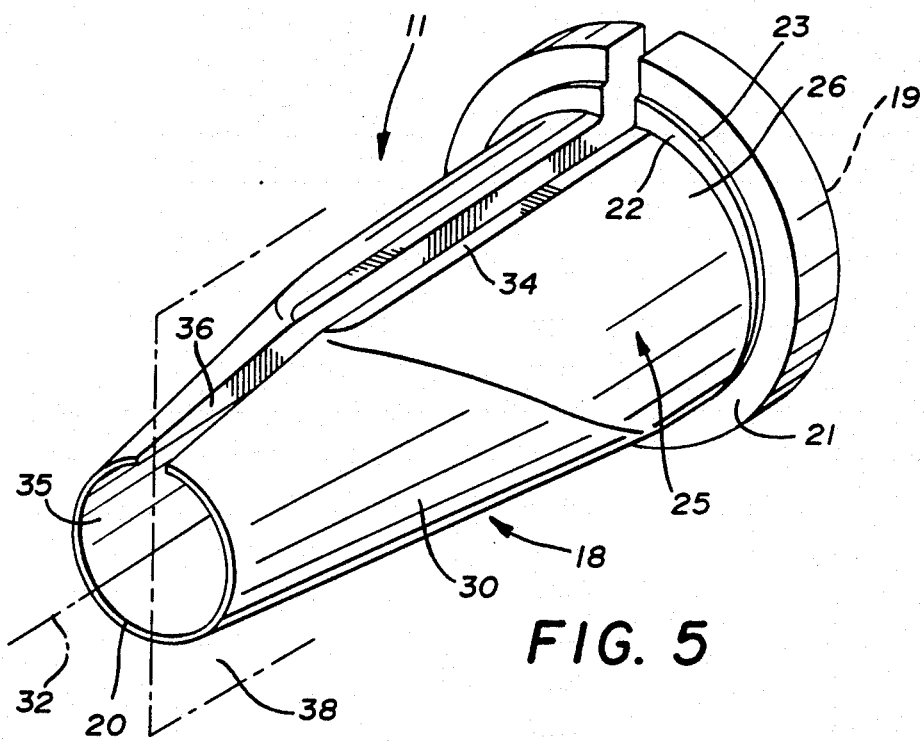
FIG. 5 is an enlarged, frontal perspective of a representative guide employed in a cutting device embodying the concept of the present invention.

An exemplary embodiment of a cutting device incorporating the concepts of the present invention is identified by the numeral 10 on the attached drawings. The cutting device 10, as depicted, generally comprises a guide 11, a machining implement 12 and a power source 13. The cutting device 10 is disclosed, and will be described, in conjunction with a workpiece 14 that is penetrated by an aperture 15, the boundary surface 16 of which is to be slotted.

The guide 11 (FIGS. 1 and 5) has a sleeve-like body portion 18 with proximal and distal ends 19 and 20 relative to the power source 13. A reaction flange 21 projects radially outwardly from the proximal end 19 of the body portion 18. Engagement of the reaction flange 21 with the workpiece 14 effects the proper longitudinal stabilization —i.e., the requisite reaction to the axial forces applied by the machining implement 12 to the workpiece 14 during the machining operation.

A locating pilot 22 is presented at the intersection of the reaction flange 21 with the body portion 18 of the guide 11 to present a radially outwardly directed surface 23 which engages a sufficient portion of the boundary surface 16 that circumscribes the aperture 15 in the workpiece 14 to effect the requisite radial orientation of the cutting device 10 with respect to the workpiece 14.

That portion of the guide 11 which is located in contiguous juxtaposition with the locating pilot 22 at the proximal end 19 of the guide 11 constitutes a horn portion 25. The exterior surface 26 of the horn 25 engages a sufficient portion of the boundary surface 16 to stabilize the machining implement 12 relative to the workpiece 14 not only during location of the cutting device 10 relative to the aperture 15 in the workpiece 14 but also during the machining operation itself. As such, the horn 25 may be conveniently fabricated so that the exterior surface 26 substantially conforms to at least a portion of the boundary surface 16 within the aperture 15 through the workpiece 14.

However, it is also quite feasible to have the exterior surface 26 of horn 25 contact the boundary surface 16 only at those locations deemed necessary to effect the proper radial stabilization —i.e., the requisite reaction to the radial load forces applied by the machining implement 12 to the workpiece 14 during the machining operation. As such, a pair of contact lobes, such as identified by the numerals 28 and 29 in FIG. 3, may be presented by the exterior surface 26 to provide the force resolution necessary to stabilize the guide 11 within the aperture 15 of the workpiece 14 and thereby rigidly support the machining implement 12 relative to the workpiece 14, particularly during the machining operation.

In those situations where the exterior surface 26 on the horn 25 fully engages a substantial portion of the boundary surface 16 the need for the locating pilot 22 may be substantially decreased. However, irrespective of whether one employs a full exterior surface 26 or contact lobes 28 and 29, the provision of the locating pilot 22 facilitates radial orientation of the guide 11 relative to the aperture 15, particularly at the conclusion of the insertion procedure.

In either event, the horn 25 preferably extends longitudinally from the reaction flange 21 along the body portion 18 of the guide 11 only for a distance sufficient to assure stabilization of the guide 11 within the aperture 15 during the machining operation. Axially beyond the horn 25 the body portion 18 of the guide 11 presents a transitional portion 30 which conically tapers toward the distal end 20 of the guide 11. The conical taper of the transitional portion 30 is represented by the angle $\phi$ at which the projection of a ray 31 in the cone defining the transitional portion 30 intersects the longitudinal axis 32 of the guide 11.

As best seen in FIGS. 3 and 5, the exterior surface 26 of the horn 25 has been longitudinally truncated to provide a shelf 34 formed as the base of the sector removed by the truncation. The shelf 34 extends from the reaction flange 21 axially along the guide 11, as depicted in FIGS. 1 and 5, until it feathers out into the transitional portion 30. The shelf 34, together with the conical surface which forms the transitional portion 30, facilitates the operable insertion of the necessary components of the cutting device 10 into the aperture 15 of the workpiece 14, all from one side thereof as will be hereinafter more fully described.

A slideway 35 extends along the longitudinal axis 32 within the interior of the guide 11. The slideway 35 opens through both the proximal and the distal ends 19 and 20, respectively, of the guide 11, and a tracking channel 36 extends radially outwardly from the slideway 35 to penetrate the body portion 18 of the guide 11 along the full axial extent thereof. As best seen in FIG. 5, the tracking channel 36 opens substantially perpendicularly through the shelf 34. A reference plane 38 bisects the tracking channel 36 and is oriented to include the longitudinal axis 32.

The machining implement 12 is slidably received within the guide 11 for protraction and retraction with respect thereto. Specifically, the machining implement 12 comprises a drive shaft 40 that is longitudinally translatable within the slideway 35, and a broach 41 is secured to the drive shaft 40. One acceptable way by which to secure the broach 41 to the drive shaft 40 is to provide a recess 42 that extends longitudinally along the cylindrical outer surface of the drive shaft 40. The base plate 43 of the broach 41 may be received within the recess 42, and a plurality of flat head machine screws 44 may be threadably received through the shaft 40 to anchor within the base plate 43 and thereby secure the broach 41 within the recess 42 provided on the exterior surface of the drive shaft 40.

The teeth 45 on the broach 41 are progressively stepped in increasing height from the first roughing tooth 45A on the broach 41 to the final finishing tooth 45N thereof. The progressive height of the teeth 45 can be represented by reference line 47 that lays across the upper extremity of each tooth 45 and is incliend, at an angle $\theta$ with respect to the longitudinal axis 32 of the guide 11. The tooth 45A having the least radial dimension is preferably positioned in proximity to the medial portion 46 of the drive shaft 40. Conversely, the tooth 45N having the greatest radial dimension is preferably positioned in proximity to the distal end 48 of the shaft 40.

The proximal end 49 of the shaft 40 comprises a shank 50 that is operatively connected to the power source 13, as will now be more fully described.

The power source 13 is carried on mounting frame 55 that includes a pair of spaced end plates 56 and 58 that are maintained in spaced relation by a plurality of pillars 59 and a handle bar 60, each of which are connected to the end plates 56 and 58. A spacer 61 extends perpendicularly outwardly from the handle bar 60 to present an offset handle 62 that may be oriented in generally parallel disposition with respect to the handle bar 60.

The end plat 56 is recessed, as at 63, to receive and locate the reaction flange 21, and, because only substantially axial forces are applied between the reaction flange 21 and the mounting frame 55, a single, relatively small, cap screw 65 may be employed to fasten the mounting frame 55 to the reaction flange 21 of the guide 11.

The recess 63 in the end plate 56 is provided with a bore 66 which preferably registers with the slideway 35 to permit the uninhibited axial translation of the drive shaft 40 therethrough. The circumference of the bore 66 is also radially slotted, as at 68, and the radial slot 68 registers with the tracking channel 36 to permit the uninhibited axial traslation of the broach 41 therethrough.

The opposite end plate 58 is provided with a bore 69 to receive the mounting nose 70 of a double acting hydraulic cylinder 71, and a nut 72 may be employed to secure the cyliner 71 to the end plate 58. The bore 69 in end plate 58 should register with the bore 66 in the end plate 56 so that the piston rod 73, which extends axially outwardly through the mounting nose 70 of cylinder 71, will align with the shank 50 of the drive shaft 40 to which it is secured. In fact, the end of the piston rod 73 may be threaded, as at 74, to be secured within a threaded, axial bore 75 in the shank 50 of the drive shaft 40.

By employing a double acting cylinder 71 the piston rod 73 may be powered in a well known manner selectively to protract or retract and thereby translate the drive shaft 40 in the selected direction.

OPERATION

To use the cutting device 10 the operator must first select a guide 11 appropriate for the size of the aperture 15 that is to be slotted. The operator must also select, and mount, a broach 41 appropriate to the depth of the slot to be machined into the boundary surface 16 of the aperture 15 in the workpiece 14. With the appropriate broach 41 thus secured in the slot 42 provided in shaft 40 the operator should preferably actuate the hydraulic cylinder 71 to test protraction and retraction of the shaft 40 and thereby assure freedom of movement of the cutting teeth 45 along the tracking channel 36. Following a test run, the shaft 40 should be protracted.

For clarity, the description as to the insertion of the machining implement 12 and the guide 11 into the workpiece 14 will be with continued reference to FIG. 1. It should be appreciated that it makes no difference whether the workpiece 14 is manipulated with respect to the cutting device 10 or vice versa. However, to simplify the drawings FIG. 1 represents what appears to be only manipulation of the workpiece 14 with respect to the cutting device 10. It must be remembered, therefore, that the dispositions depicted are relative, the workpiece 14 with respect to the cutting device, and with that mental awareness it becomes immediately apparent that it makes absolutely no difference which is moved with respect to the other.

Beginning, then, with a discussion as to the critical dimensions of the machining implement 12 to the workpiece 14 represented at station 80A, it will be appreciated that the projected vertical dimension of the side elevational profile of the machining implement 12, taken at the distal end 48 of the shaft 40, is less than the corresponding diameter of the aperture 15. Understand that when speaking of the side elevational profile of the machining element at the distal end of the shaft 40 the height to which the finishng tooth 45N extends radially above the shaft 40 is added to the diameter of the shaft 40. As such, the side elevational profile of the machining element includes the composite projected dimension of the drive shaft 40 and the broach 41.

With the foregoing dimensional relationship existing between the machining implement 12 and the aperture 15 through the workpiece 14, no difficulty will be encountered in inserting the machining implement 12 into the aperture 15.

The next critical dimensional relationship encountered during the process of inserting the machining implement 12 and the guide 11 into, and sufficiently through, the aperture 15 occurs at the distal end 20 of the guide 11. To insert the machining implement 12 and the guide 11 into the aperture 15 at that station, represented as 80B in FIG. 1, the projected elevational dimension for the side profile of said guide 11, at the distal end 20 thereof and as measured within said reference plane 38, must be such that the effective radial dimension for the body portion 18 of the guide 11 opposite said tracking channel 36 plus the diameter of the drive shaft 40, including the maximum height of any cutting tooth within the aperture 15 and extending radially outwardly through the tracking channel 36 at the axial location where the effective radial dimension of the guide 11 is being considered, must be less than the diameter of the aperture 15.

The foregoing condition is met, in part, by the conicity of the guide 11 and, in part, by the extent to which the drive shaft has been protracted, and therefore also the inclination of the cutting teeth that lie within the aperture 15, but once that condition is met —and so long as the inclination $\phi$ of the conical ray 31 defining the conicity of the transitional portion 30 is not excessively greater than the inclination $\theta$ of the progressively stepped cutting teeth 45 — the assembled guide 11 and machining implement 12 can continue to be inserted into the aperture 15 to station 80C. The most effective relative dimensions and conicity can be readily determined by minimal experimentation once the overall concept is understood.

At this point in the operational explanation it should be understood that the "effective" radial dimension of the body portion 18 will be the distance between the slideway 35 and the boundary surface 16 of aperture 15, measured diametrically opposite the tracking channel 36, and thus within the plane 38, inasmuch as the effective radial dimensions of that component is not functionally altered irrespective of whether the surface 26 on horn 25 engages the boundary surface 16 of the aperture 15 or whether the lobes 28 and 29 engage the boundary surface 16 on either side of the plane 38, as depicted in FIG. 3.

At the location identified as station 80C in FIG. 1 the horn portion 25 of the guide 11 must begin its insertion into the aperture 15. To permit that to be accomplished the effective radial dimension of said guide 11 opposite the tracking channel 36 plus the diameter of the drive shaft 40, including the height of any cutting teeth 45 extending through the tracking channel 36 opposite the location where the effective radial dimension of the guide 11 is being considered, must be less than the diameter of the aperture 15.

The employment of a shelf 34 facilitates maintenance of the requisite angularity between the guide 11 and the aperture 15 as the workpiece 14 moves axially relative to the guide 11 in order to clear the teeth 45 and allow the workpiece 14 and guide 11 to be straightened, one with respect to the other, so the horn portion 25 of the guide 11 can properly engage the aperture 15

As soon as the aperture 15 clears the first roughing tooth 45A the workpiece 14, which is by now axially aligned with the guide 11, can be translated along the horn 25 and be fitted onto the locating pilot 22 and in engagement with the reaction flange 21. In that position, represented as station 80D in FIG. 1, the operator can actuate the cylinder 71 to retract the piston rod 73 and draw the machining implement 12 through the aperture 15 to excise a slot, as depicted in phantom at 81, therein.

Thus, the effective radial dimension of said guide 11 opposite said tracking channel 36, and measured within said reference plane 38, plus the diameter of said drive shaft 40, including the height of the last finishing tooth 45N, equals the diameter of said aperture 15, also measured along said reference plane 38, plus the radial depth of the slot 81 to be excised in the boundary surface 16 of the aperture 15.

The slot 81 may be of minimal radial dimension, or it can equal the radial dimension of the workpiece 14. By making the slot 81 equal to the radial dimension of the workpiece 14 one can employ the device 10 effectively to cut radially through, for example, a workpiece that is received within another item. By so slotting the workpiece its removal may be facilitated. One application for such an operation would be to remove a hollow tube that has been anchored within a bore. In such a situation it may even be desirable to excise a diametrically opposed pair of such slots. This type of usage for the cutting device 10 is exemplified by the arrangement depicted in FIGS. 6 and 7.

Figure 6:
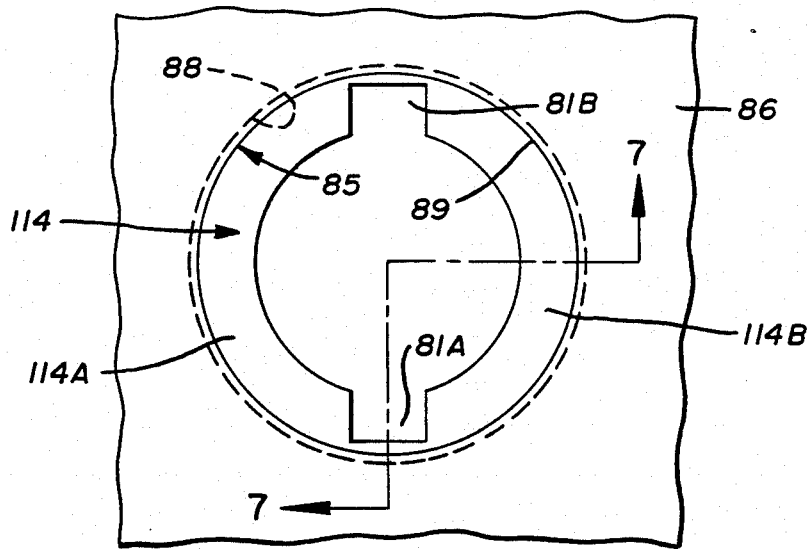
FIG. 6 is a top plan view of a typical wall that is penetrated by an aperture within which an annular member is received and which is depicted as having been notched in a diametrically opposed manner by a cutting device embodying the concepts of the present invention, and, FIG. 7 is transverse section taken substantially along line 7-7 of FIG. 6.
Figure 7:
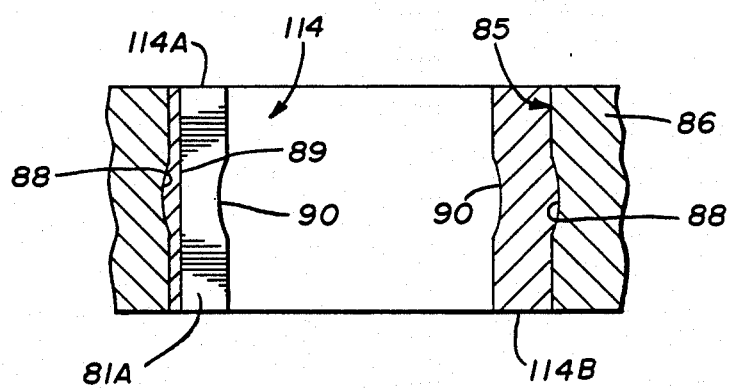

With reference to FIGS. 6 and 7 a bore 85 is depicted as being provided through a wall 86, and a circumferential notch 88 may be recessed into the perimeter surface 89 of the bore 85.

An annular member in the nature of a sleeve, bushing, pipe or the like may constitute the workpiece 114 that is received within the bore 85 and expanded, as at 90, lockingly to engage the notch 88. Such an interlocking fit between the workpiece 114 and the bore 85 makes it extremely difficult ever to remove the workpiece without damaging the perimeter surface 89 of the bore 85. However, by employing the cutting device 10 one can readily excise a diametrically opposed pair of notches 81A and 81B into the workpiece 114. The opposed notches 81A and 81B need not completely penetrate the workpiece 114, but the notches should be cut to a depth which permits one, with a hammer or the like, sequentially to translate each of the resulting halves 114A and 114B of the workpiece radially in order to disengage that half 114A or 114B from the notch 88 and then axially to translate that half out of the bore 85. By successively removing each half one can, with facility and the utmost convenience, perform a task that has heretofore been deemed to be exceedingly difficult to accomplish, and particularly in the field.

It should, therefore, now be apparent that a cutting device embodying the concepts of the present invention fully achieves the objects thereof.

I claim:

1. A portable cutting apparatus for excising an axial slot into the boundary surface of an aperture in a workpiece, said cutting apparatus comprising:
   a power source;
   a guide means having a sleeve-like body portion with proximal and distal ends relative to said power source;
   a reaction flange extending radially from the proximal end of said guide means to engage the workpiece and effect longitudinal stabilization between the cutting apparatus and the workpiece;
   a locating pilot located at the intersection of said reaction flange and said guide means;
   a radially outwardly directed locating surface presented from said locating pilot to engage the aperture in the workpiece and effect radial orientation of the cutting apparatus relative to the workpiece;
   a slideway extending longitudinally within the guide means and opening through the proximal and distal ends thereof;

a tracking channel extending radially outwardly from said slideway to penetrate said guide means along the axial extent thereof;

a drive shaft received for longitudinal translation within said slideway;

said drive shaft also having proximal and distal ends relative to said power source with a medial portion therebetween;

said proximal end of said drive shaft operably attached to said power source;

a broach;

said broach having a base plate with a plurality of teeth extending outwardly of said base plate;

said base plate being fully supported by, and being demountably secured to, said drive shaft from between approximately the medial portion of said drive shaft to approximately the distal end thereof;

said broach being oriented such that said teeth extend radially outwardly through said tracking channel;

said teeth being progressively stepped with the roughing tooth having the least radial dimension being located in proximity to the medial portion of said drive shaft and with the finishing tooth having the greatest radial dimension located in proximity to the distal end of said drive shaft;

a horn portion presented from said guide means to engage a sufficient portion of the aperture to stabilize said broach and said drive shaft relative to the workpiece;

said horn portion being longitudinally truncated to provide a shelf formed as the base of the sector removed by truncation;

a transition portion extending between the distal end of said guide means and said horn portion thereof to present a generally conical exterior surface;

said shelf extending the full axial extent of said guide means to feather into generally conical exterior surface of said transition portion; and said tracking channel opening through said shelf such that said shelf truncates said guide means on both sides of said tracking channel.

2. A portable cutting apparatus, as set forth in claim 1, wherein the projected dimension of the side elevational profile of said guide means at the distal end thereof is such that the effective radial dimension of said guide means opposite said tracking channel plus the diameter of said driven shaft, including the height of said cutting tooth extending through said tracking channel at the axial location where the effective radial dimension of said guide means is being considered, is less than the corresponding diameter of the boundary surface for the aperture through said workpiece.

3. A portable cutting apparatus, as set forth in claim 2, wherein the dimensions comprising the elevation profile of said guide means in proximity to the proximal end thereof being such that the radial dimension of said guide means opposite said tracking channel plus the diameter of said drive shaft, including the height of said cutting teeth extending through the tracking channel opposite the location where the effective radial dimension of the guide means is being considered, is greater than the diameter of the aperture to be slotted.

* * * * *